Sheet 1. 4 Sheets.
E. B. Bigelow.
Weaving Pile Fabric.
No. 436. Reissued Mar. 17, 1857.
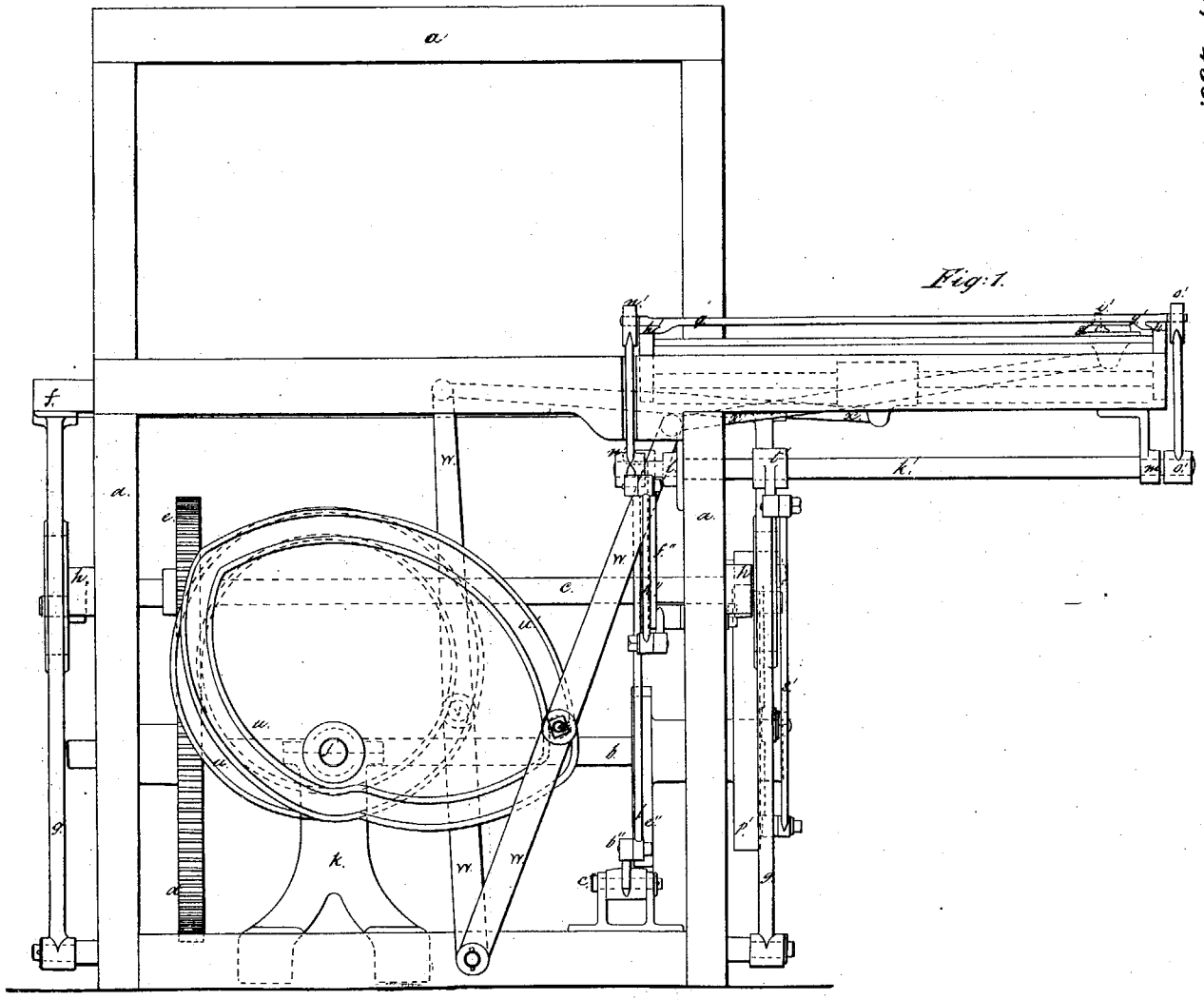
H. PETERS, PHOTO-LITHOGRAPHER, WASHINGTON, D. C.

Sheet 2 - 4 Sheets.
E. B. Bigelow.
Weaving Pile Fabric.
No. 436. Reissued Mar. 17, 1857.
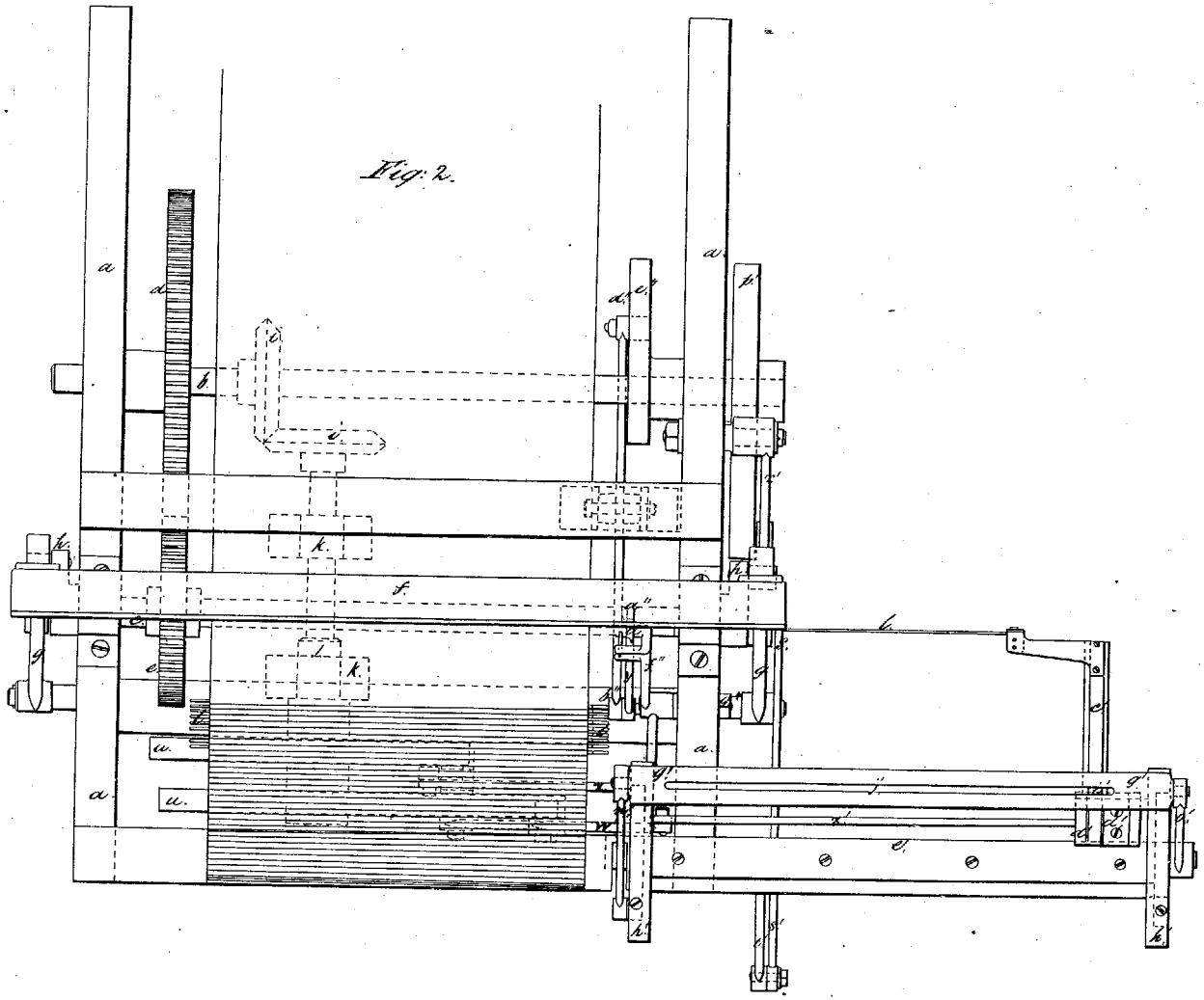
N. PETERS, PHOTO-LITHOGRAPHER, WASHINGTON, D. C.

Sheet 3 - 4 Sheets.
E. B. Bigelow.
Weaving Pile Fabric.
No. 436. Reissued Mar. 17, 1857.
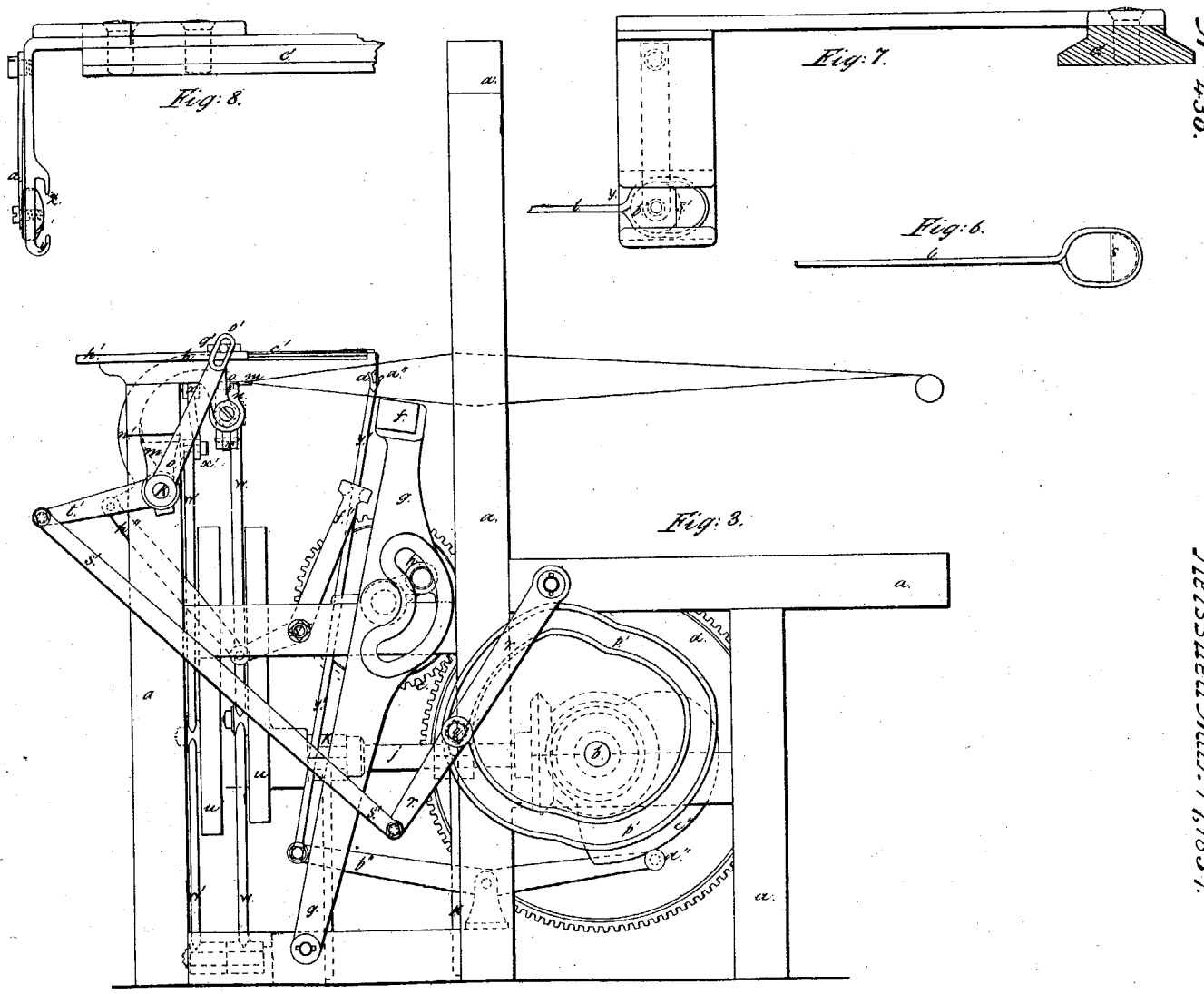
N. PETERS, PHOTO-LITHOGRAPHER, WASHINGTON, D. C.

E. B. Bigelow.
Weaving Pile Fabric.
No. 436.
Reissued Mar. 17, 1857.
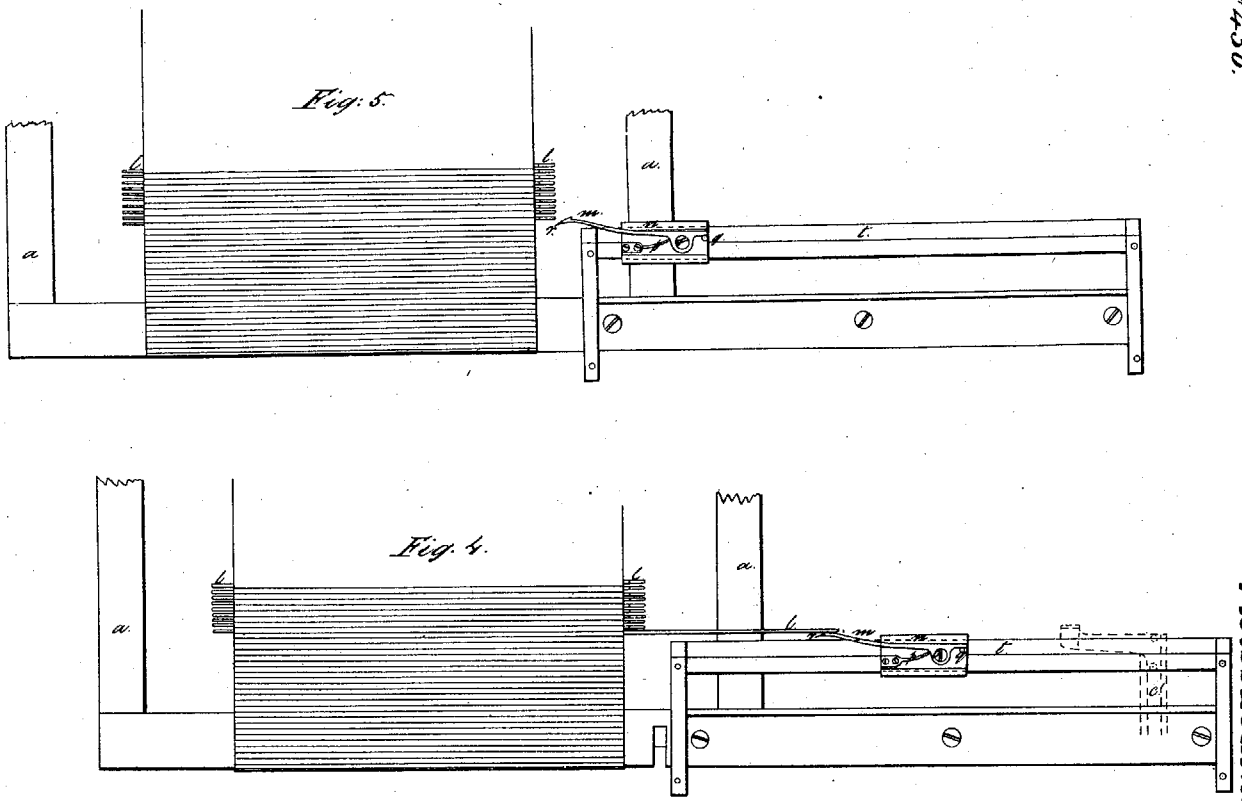
N. PETERS, PHOTO-LITHOGRAPHER, WASHINGTON, D. C.

UNITED STATES PATENT OFFICE.

ERASTUS B. BIGELOW, OF BOSTON, MASSACHUSETTS.

IMPROVEMENT IN LOOMS FOR WEAVING PILE FABRICS.

Specification forming part of Letters Patent No. 13,936, dated December 18, 1855; Reissue No. 436, dated March 17, 1857.

*To all whom it may concern:*

Be it known that I, ERASTUS B. BIGELOW, of Boston, in the county of Suffolk and State of Massachusetts, have invented new and useful Improvements in Power-Looms for Weaving Pile or Terry Fabrics by Pile-Wires; and I do hereby declare that the following is a full, clear, and exact description thereof, reference being had to the accompanying drawings, in which—

Figure 1 is a front elevation; Fig. 2, a plan; Fig. 3, an end elevation, and Figs. 4, 5, 6, 7, and 8 are details.

The same letters indicate like parts in all the figures.

These improvements relate to the power-loom for weaving pile or terry fabrics in which the pile-wires, over which the pile is formed, are operated by automatic machinery, and are improvements on my Brussels-carpet loom patented March 7, 1847.

Heretofore, in power-looms for weaving pile or terry fabrics with a series or optional number of pile-wires, said pile-wires have been drawn from the cloth by pliers, forceps, or pinchers, so constructed and operated as to grasp the wires when they act thereon.

One part of my present invention consists in the application or employment of a latch or hook to draw the pile-wires from the cloth, said latch or hook being so constructed and operated as to engage with said pile-wires by latching or hooking into suitable notches formed in the edges or sides thereof, said latch or hook being also so constructed and operated with respect to the other parts of the loom as, at appropriate times, to have a motion toward the cloth, (or the ends of the wires,) to successively engage with said wires, and a motion from the cloth to draw said wires therefrom. The latch or hook may also be employed to aid in carrying the pile-wires forward and inserting them in the shed of the warps; or this part of the operation may be performed by other apparatus, as hereinafter to be described.

A part of my invention also consists in the mode of constructing and operating the aforesaid latch or hook for drawing the pile-wires from the cloth so that said latch or hook shall, at appropriate stages of its operation, successively deliver said pile-wires to a carrier or apparatus which completes their movement.

A part of my invention also consists in combining with said latch or hook for successively drawing the pile-wires from the cloth, a carrier or apparatus so constructed and operated as to successively receive the pile-wires from said latch or hook and transfer them to their appropriate place at the fell of the cloth.

Heretofore power-looms for weaving pile or terry fabrics, in which the pile-wires are operated by machinery, have been organized so that the shuttle is at rest while the pile-wires are being inserted in the shed of the warps, thus requiring a special beat of the lathe for the operation of each of said pile-wires.

The last part of my invention therefore consists in the mode of organizing and operating the power-loom for weaving pile or terry fabrics, in which the pile-wires are withdrawn and inserted by automatic machinery, whereby said pile-wires are successively inserted in the shed of the warps at the same time the shuttle is being passed from side to side of the loom, the warp being formed into a double shed—that is to say, the ground-warps being opened to form the lower shed for the passage of the shuttle, and the pile-warps being raised above the ground-warps to form the upper shed for the reception of said pile-wires, the motions for operating the shuttles and inserting said pile-wires being performed simultaneously, thus saving one beat of the lathe for every operation of the system of motions of the loom.

*a a a* represent the frame of the loom.

*b* represents the cam-shaft, and *c* the lathe-shaft, which are geared together in the usual way by the gears *d* and *e*, said gears being in the ratio to give one revolution of the former to two of the latter.

*f* represents the race-beam of the lathe, and *g g* the swords of the lathe, which are operated by the cranks *h h* in the usual way.

*i i* are miter-gears, which communicate motion from the cam-shaft *b* to the counter-shaft *j*. The counter-shaft *j* turns in the stands *k k*, and carries the cams which operate the wire motion, as herein to be described.

The let-off and take-up motion, shipping apparatus, and other parts of the loom, not necessary to the proper understanding of my improvements, are omitted in the drawings.

The pile-wires *l l l* may be formed with a head on one end, as represented in Fig. 6. The body of the pile-wires *l l* may be round, flat, or oval, according to the length and form of the pile required.

The latch or hook for drawing the pile-wires *l l l* from the cloth is represented by *m*, and may be distinctly seen in Figs. 4 and 5. It has a motion toward and from the selvage of the cloth, and is carried by the sliding bar *n*. The latch or hook *m* has also a vibratory motion on the screw *o*, and is pressed toward the pile-wires *l l l* by the spring *p*, and is prevented from swinging too far for its proper action on said pile-wires by the stop-pin *q*. When the said latch or hook *m* approaches the selvage of the cloth the latch or hook *m* is in the position shown in Fig. 5, and as the beveled part *r* strikes the head of the pile-wire *l* to be acted upon the latch or hook *m* latches or hooks into the notch or eye *s*. Then as the said latch or hook *m* recedes from the selvage of the cloth it draws out the said pile-wire *l*, as in Fig. 4, where it is represented as drawn about half out. The beveled part *r* of said latch or hook should be thick enough to allow for any variation there may be from time to time in the position of the pile-wire to be acted upon, so that whether the said pile-wire be a little nearer or a little farther from the breast-beam the latch or hook will swing far enough to catch it.

The sliding bar *n* before alluded to slides to and fro on the square bar *t*, and receives motion from the double-cam *u* on the before-mentioned counter-shaft *j*. The double cam *u* acts on the cam-roller *v*, and, through the medium of the upright vibrating lever *w* and connecting-bar *x*, imparts motion to the said sliding bar *n*, as aforesaid. When the latch or hook *m* has nearly completed its outward movement, the carrier which is to receive the pile-wire from said latch or hook comes to the position represented by the red lines in Fig. 4, and said latch or hook draws the outer or head end of the pile-wire into the socket of the said carrier, and a forked bar rises up to receive the other end of the said pile-wire as it is drawn from the cloth. Then when said carrier and forked bar are thus armed with a pile-wire, they move in unison back with the lathe to the point where said wire is to be inserted in the shed of the warp, as represented in Fig. 2. Then the forked bar stops and the said carrier moves toward the selvage of the cloth, sliding said pile-wire upon said forked bar until said wire is fairly introduced into the shed. Then said forked bar drops down to make way for said carrier, which completes the insertion of the said wire, and moves forward with it to the face of the cloth and holds it in position until it is otherwise secured.

A full-sized end view of the carrier which receives the outer or head end of the pile-wires and carries them to the face of the cloth, as aforesaid, is given in Fig. 8, and a front view thereof in Fig. 7. An end view of the socket in said carrier which receives the outer or head ends of the pile-wires is represented at *y*.

*z* represents an opening in the front side of the socket *y*, to allow the latch or hook *m* to pass as it draws in a pile-wire.

The blue lines in Fig. 7 represent a pile-wire after it has been drawn into said socket.

*a'* represents a spring-binder provided with a bulge or convex projection, *b'*, on its lower end, which sinks into the eyes of the pile-wires as they are drawn into the socket and keeps them in position, and though the spring *a'* is stiff enough to keep the pile-wires in the socket during its movement it is not so stiff but that the said socket can be withdrawn from said pile-wires without displacing them after they have been secured by the reed or the warps at the face of the cloth.

For the greater convenience in applying the motions to the carrier containing the socket *y* the arm of said carrier is bent, as represented in Figs. 2, 7, and 8, which brings the end thereof into the proper position to be secured to the sliding bar *c'*. The sliding bar *c'* slides toward and from the lathe in suitable grooves in the sliding plate *d'*. The sliding plate *d'* slides toward and from the selvage of the cloth on the ways *e'* and *f'*.

*g'* represents a bar which slides on the ways *h' h'* and imparts the sliding movement to the sliding bar *c'*. The latter piece is connected with the former by the stud *i'* working in the long slot *j'*, so that while the sliding bar *c'* moves forward and back in unison with the bar *g'* it at the same time is free to move toward and from the selvage of the cloth when carried by the sliding plate *d'*.

*k'* represents a rock-shaft which rocks in the bearings *l'* and *m'*.

*n'* and *o'* represent arms, which are affixed to and extend from the rock-shaft *k*, and have slots at their upper extremities, in which the ends of the bar *g'* respectively play. The arm *n'* is bent, as shown by dotted lines in Fig. 3, to clear the breast-beam. The double cam *p'* on the cam-shaft *b* acts on the cam-roller *q'*, and through the medium of the lever *r'*, and connecting-bar *s'* and arm *t'*, rocks the said rock-shaft *k'*, and thus imparts to the above-described carrier its motion toward and from the lathe. Its motion toward and from the selvage of the cloth is given by the double cam *v'* on the counter-shaft *j*, which acts on the cam-roller *v'*, and through the medium of the upright lever *w'* and connecting-bar *x'* moves the sliding plate *d*, which, as before stated, carries the sliding bar *c'*, to which the said carrier is attached.

The bar *g'*, instead of sliding on the ways *h' h'*, may be carried toward and from the lathe by the arms *n'* and *o'*, in which case the ways *h' h'* would be dispensed with and the ends of the bar *g'* rest in suitable holes made in lieu of the slots in the upper ends of said arms $n'$ and $o'$. In looms for some fabrics I place the bar $g'$, rock-shaft $k'$, and their appendages above the lathe.

$y'$ represents the forked bar before mentioned for receiving the inner ends of the pile-wires as they are successively drawn from the cloth and carrying them back to the point where they are to be inserted in the warps. The upper end of said forked bar $y'$ is provided with a fork, $a''$, for the pile-wires to drop into, while its lower end is jointed to the forward end of the rock-lever $b''$. The rock-lever $b''$ rocks on the stud $c''$, and carries at its rear end the cam-roller $d''$. The forked bar $y'$ is raised by the cam $e''$ acting on the roller $d''$, but in descending follows the cam and falls by its own gravity. The forked bar $y'$ is kept in its upright position and moved toward and from the lathe in unison with the aforesaid carrier, by the bent lever $f''$, which has a suitable opening for it to play in at its upper end and rocks on the stud $g''$. The lower arm of the bent lever $f''$ is connected to an arm extending from the before-mentioned arm $n'$ by the bar $h''$, so when the arm $n'$ moves the carrier, it also moves the forked bar $y'$ in unison with it.

To prevent the wires from springing out of the fork $a''$, a horizontal bar may be placed just above the line of the pile-wires, so that when the said fork raises the end of any wire to carry it to the place where it is to be inserted in the warps, the said bar rests upon it and keeps it in its proper place in the fork $a''$. A cam may also be employed to raise the said bar to clear the shuttle and to depress it again to act on a pile-wire; but as the fork forms no part of my present invention, these parts are not represented in the drawings.

The above-described improvements for operating the pile-wires may be used in connection with the usual guides for guiding and supporting the pile-wires as they pass between the warps.

In constructing and organizing the loom for inserting the pile-wires at the same time the shuttle is being passed from side to side of the loom, the cam-shaft $b$ is connected with the lathe-shaft $c$ by gears $d$ and $e$, which, as before stated, are proportioned in the ratio of one of the former to two of the latter, which allows a throw of the shuttle at every beat of the lathe, and the cams which operate the pile-wires—that is to say, the double cam $u$ for operating the aforesaid latch or hook for drawing the pile-wires from the cloth, and the double cams $u'$ and $p'$ for operating the carrier or apparatus which receives said pile-wires from said latch or hook, as aforesaid, and also the cam $e''$, which elevates and depresses the forked bar or guide which receives the inner ends of the pile-wires as they are successively drawn from the cloth—are all so shaped as to cause the parts they respectively actuate to perform their functions at appropriate times with respect to the motions of the shuttle and the lathe.

The motion of the lathe-shaft $e$ relative to the motion of the cam-shaft $b$, as just described, is such as is employed to weave Brussels carpets and other fabrics which have a single binding shot of weft; but in weaving fabrics which require a double binding-shot—such as Wilton and tapestry velvet carpets—said lathe-shaft $e$ should have three revolutions to the said cam-shaft $b$ one, and the said double cams for operating the pile-wires should be modified accordingly, the object being to have only as many beats of the lathe as there are throws of the shuttle, and not have any specified beat of the lathe for the insertion of the pile-wires, thus proportionally increasing the working power of the loom.

It will be obvious to machinists that the form and structure of the parts of the loom which embody my said improvements, and also the distribution of the several functions thereof, may be greatly varied without changing their essential character, and also that said improvements may be used together, as described, or in part, in connection with other devices in other looms, and the part or parts so employed remain substantially the same.

Having thus described my said improvements in power-looms for weaving piled or terry fabrics, what I claim as new therein, and desire to secure by Letters Patent, is—

1. Successively drawing the pile-wires from the cloth by a latch or hook, substantially as specified.

2. Constructing and operating said latch or hook so that after drawing said pile-wires from the cloth it successively delivers them to a carrier or other apparatus, which completes their movement, substantially as specified.

3. In combination with a latch or hook for drawing the pile-wires from the cloth, a carrier or apparatus to successively receive said pile-wires from said latch or hook and transfer them to the fell of the cloth, substantially as specified.

4. The method of inserting the pile-wires into the upper shed of the warps, while the shuttle is passed through the lower shed, substantially in the manner and for the purpose specified.

E. B. BIGELOW.

Witnesses:
CHAS. HASTINGS,
FRANK F. HASTINGS.